(12) United States Patent  
Huang

(10) Patent No.: US 9,229,595 B2  
(45) Date of Patent: Jan. 5, 2016

(54) TOUCH DETECTION APPARATUS AND METHOD OF DRIVING THE SAME

(71) Applicant: Shanghai Tianma Micro-Electronics Co., Ltd., Shanghai (CN)

(72) Inventor: Zhongshou Huang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 8 days.

(21) Appl. No.: 14/072,676

(22) Filed: Nov. 5, 2013

(65) Prior Publication Data

US 2014/0146009 A1    May 29, 2014

(30) Foreign Application Priority Data

Nov. 27, 2012    (CN) .......................... 2012 1 0492460

(51) Int. Cl.
*G06F 3/041*    (2006.01)
*G06F 3/044*    (2006.01)

(52) U.S. Cl.
CPC .............. *G06F 3/044* (2013.01); *G06F 3/0416* (2013.01)

(58) Field of Classification Search
CPC ............................... G06F 3/03547; G06F 3/044
USPC .................................................. 345/173–178
See application file for complete search history.

(56) References Cited

U.S. PATENT DOCUMENTS

| 8,766,939 | B2 * | 7/2014 | Sobel et al. | 345/173 |
| 2011/0181544 | A1 * | 7/2011 | Lee | 345/174 |
| 2011/0248955 | A1 | 10/2011 | Mo et al. | |
| 2011/0298737 | A1 * | 12/2011 | Maeda et al. | 345/173 |
| 2013/0141372 | A1 * | 6/2013 | Kang | 345/173 |
| 2014/0160070 | A1 * | 6/2014 | Miyamoto et al. | 345/174 |

FOREIGN PATENT DOCUMENTS

| CN | 102236483 A | 11/2011 |
| CN | 102576272 A | 7/2012 |

OTHER PUBLICATIONS

Office Action as received in corresponding Chinese Application No. 201210492460,1, dated Jun. 25, 2015.

* cited by examiner

*Primary Examiner* — Roy Rabindranath
(74) *Attorney, Agent, or Firm* — Alston & Bird LLP

(57) ABSTRACT

A touch signal scan apparatus and a touch signal scan method are disclosed. The apparatus includes: a drive signal supply unit electrically connected with M drive lines in one-to-one correspondence, an electrode layer in which the M drive lines and N sense lines are arranged, and N amplifiers electrically connected with different output ends of the N sense lines in one-to-one correspondence. The drive signal supply unit is configured to supply drive signals with at least two different frequencies to the M drive lines in a period of one frame, and the frequencies of the drive signals supplied to two adjacent drive lines are different. The apparatus further includes a bandwidth filter electrically connected with the N amplifiers and configured to separate sense signals output from the N amplifiers so as to obtain the sense signals corresponding to the respective drive signals with the at least two different frequencies.

13 Claims, 5 Drawing Sheets

TOUCH DETECTION APPARATUS AND METHOD OF DRIVING THE SAME

CROSS-REFERENCES TO RELATED APPLICATIONS

The present application claims priority to Chinese patent application No. 201210492460.1, entitled "TOUCH SIGNAL SCAN APPARATUS AND TOUCH SIGNAL SCAN METHOD", filed with the State Intellectual Property Office of People's Republic of China on Nov. 27, 2012, the contents of which is incorporated herein by reference in its entirety.

FIELD OF THE INVENTION

The present invention relates to the field of touch screens, and more particularly to a touch signal scan apparatus and a touch signal scan method.

BACKGROUND OF THE INVENTION

Capacitive touch screens can be categorized into self-inductive capacitive ones and mutual inductive capacitive ones as per their detection mode of a touch signal. A mutual inductive capacitive touch screen comprises a plurality of drive lines and a plurality of sense lines intersecting the drive lines orthogonally, and mutual inductive capacitances are formed between the drive lines and the sense lines, where the capacitances at the locations where the drive lines and the sense lines overlap are not changeable by an outside touching object, and the mutual inductive capacitances formed by a fringe electric field generated at the locations where no electrodes overlap are influenced directly by an outside touching object.

The touch screen is scanned in the prior art as follows: a drive signal at a specific frequency is input line by line from one end of a drive line, and a signal at the same frequency is output from a sense line. When an object comes into contact with the surface of the touch screen, parasitic capacitances with a drive line and a sense line are formed, and a portion of the sense signal will leak to ground by the parasitic capacitances through a human body or the grounded object, so that the sense signal generated at that location will be attenuated, and therefore a specific location where a finger touches can be ascertained by detecting a signal change of the sense lines sequentially.

Typically, it is very likely for a finger to touch in a constantly moving way instead of touching at a point or in a defined area. Thus, when a drive signal is injected to each row sequentially in the vertical direction, that is, a scan line by line, there is a variable angle formed between the scan direction and a moving vector of a finger in a touch area. The amplitude and the profile of a gained touch signal will vary with this angle, and in the extreme case that the angle is equal to zero, there will be a special instance in which a scan pulse follows the moving finger. When the finger moves at a speed greater than or equal to a fast scan speed, there will even be a situation in which the moving touch signal fails to be followed and there is no output while there is a touch. Even if the scan speed is far above an instantaneous speed at which the finger goes across the surface of the display screen, there will be a different output signal arising from a different moving direction of the finger, thus resulting in a non-uniform touch signal. When there are a plurality of touch points at the same time, output signals of the different touch points may be different due to their relative distances and relative speeds to the spatial location of a drive signal, thus distorting the gained touch information. Consequently, when the touch screen is scanned, the precision of detecting the touching finger in motion may be low and the acquired information of the touching finger may not be comprehensive, thus making the scan inefficient.

BRIEF SUMMARY OF THE INVENTION

The invention is to provide a touch signal scan apparatus and a touch signal scan method.

An embodiment of the invention provides a touch signal scan apparatus including:

a drive signal supply unit electrically connected with M drive lines in one-to-one correspondence, an electrode layer in which the M drive lines and N sense lines are arranged; and N amplifiers electrically connected with different output ends of the N sense lines in one-to-one correspondence; and the drive signal supply unit is configured to supply drive signals with at least two different frequencies to the M drive lines in a period of one frame, and the frequencies of the drive signals supplied to two adjacent drive lines are different.

The apparatus further includes a bandwidth filter that is electrically connected with the N amplifiers and configured to separate sense signals output from the N amplifiers so as to obtain the sense signals corresponding to the respective drive signals with the at least two different frequencies.

An embodiment of the invention provides a touch signal scan method including:

supplying drive signals with at least two different frequencies to M drive lines in a period of one frame, and the frequencies of the drive signals supplied to two adjacent drive lines are different;

outputting sense signals with the same frequencies as the drive signals with the at least two different frequencies by N sense lines to a bandwidth filter, the bandwidth filter is electrically connected with N amplifiers which are electrically connected with the N sense lines in one-to-one correspondence; and separating the sense signals with the different frequencies by the bandwidth filter so as to obtain the sense signals corresponding to the respective drive signals with the at least two different frequencies.

DETAILED DESCRIPTION OF THE INVENTION

An implementation process of embodiments of the invention will be detailed below with reference to the drawings.

Figure 1:
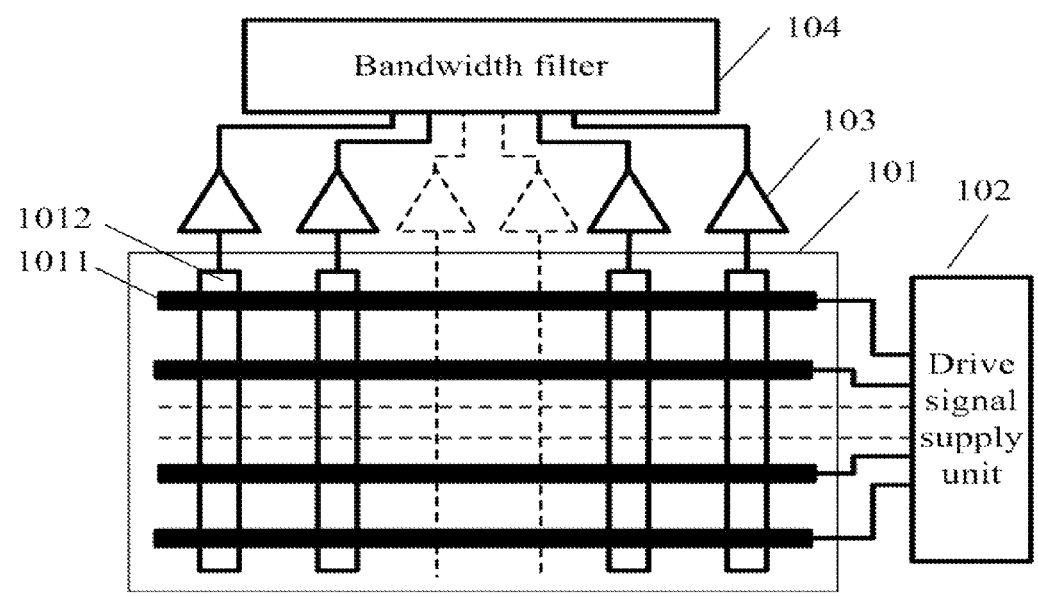
FIG. 1 is a schematic diagram of a touch signal scan apparatus according to a first embodiment of the invention.

A first embodiment of the invention provides a touch signal scan apparatus as illustrated in FIG. 1. The apparatus includes: an electrode layer 101 in which M drive lines 1011 and N sense lines 1012 are arranged, wherein, M and N are integers greater than 0; a drive signal supply unit 102 electrically connected with the M drive lines 1011; and N amplifiers 103 electrically connected with different output ends (terminals) of the N sense lines in one-to-one correspondence.

The drive signal supply unit 102 is configured to supply drive signals with at least two different frequencies to the M drive lines 1011 in a period of one frame, and the frequencies of the drive signals supplied to two adjacent drive lines 1011 are different.

The apparatus further includes a bandwidth filter 104 electrically connected with the N amplifiers 103, and the apparatus is configured to separate sense signals output from the N amplifiers 103 so as to obtain the sense signals corresponding to the respective drive signals with the at least two different frequencies.

Wherein, signal input ends (terminals) of two adjacent drive lines 1011 are at the same side.

In the first embodiment, the input ends (terminals) of the drive lines in the electrode layer are at the same side, and the drive signal supply unit enables inputting of the drive signals with at least two drive frequencies, or in other words, the drive signal supply unit allows the concurrent driving of at least two drive lines, and the bandwidth filter then processes the sense signals to thereby improve the detecting precision of a moving finger. The drive signal supply unit and the bandwidth filter make acquired information of the touching finger more comprehensive and hence improve the efficiency of scanning a touch screen.

It shall be noted that the signal input ends of two adjacent drive lines 1011 are at the same side, wherein, the same side includes the right side or the portion near the right edge of the electrode layer 101 as illustrated in FIG. 1, but those skilled in the art can appreciate that the left side or the portion near the left edge of the electrode layer 101 will also be included in the embodiment.

Figure 2:
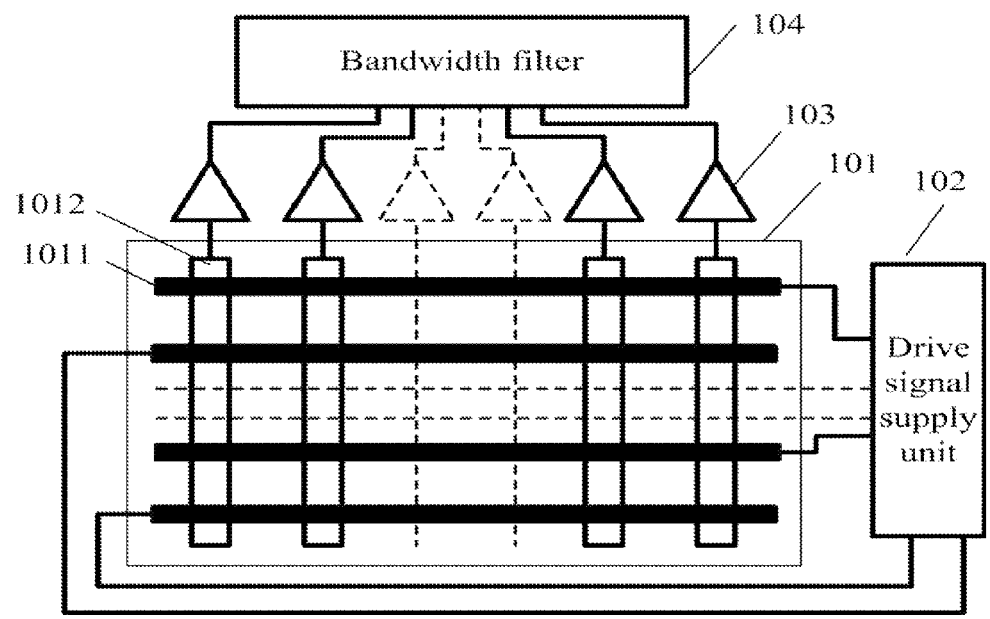
FIG. 2 is a schematic diagram of a touch signal scan apparatus according to a second embodiment of the invention.

A second embodiment of the invention provides a touch signal scan apparatus as illustrated in FIG. 2. The apparatus includes: an electrode layer 101 in which M drive lines 1011 and N sense lines 1012 are arranged, wherein, M and N are integers greater than 0; a drive signal supply unit 102 electrically connected with the M drive lines 1011; and N amplifiers 103 electrically connected with different output ends (terminals) of the N sense lines in one-to-one correspondence (i.e., each of the N amplifiers is electrically connected with a respective output terminal of the N sense lines).

The drive signal supply unit 102 is configured to supply drive signals with at least two different frequencies to the M drive lines 1011 in a period of one frame, and the frequencies of the drive signals supplied to two adjacent drive lines 1011 are different.

The apparatus further includes a bandwidth filer 104 electrically connected with the N amplifiers 103, and the apparatus is configured to separate sense signals output from the N amplifiers 103 so as to obtain the sense signals corresponding to the respective drive signals with the at least two different frequencies.

Signal input ends of two adjacent drive lines 1011 are at different (opposite) sides of the electrode layer 101.

In the second embodiment, the input ends of the drive lines in the electrode layer are at different sides, and the drive signal supply unit and the bandwidth filter enable inputting of the drive signals with the at least two drive frequencies, or in other words, they enable the concurrent driving of at least two drive lines, and then process the sense signals to thereby improve the detecting precision of a moving finger. The drive signal supply unit and the bandwidth filter make acquired information of the touching finger more comprehensive and hence improve the efficiency of scanning a touch screen.

Figure 3:
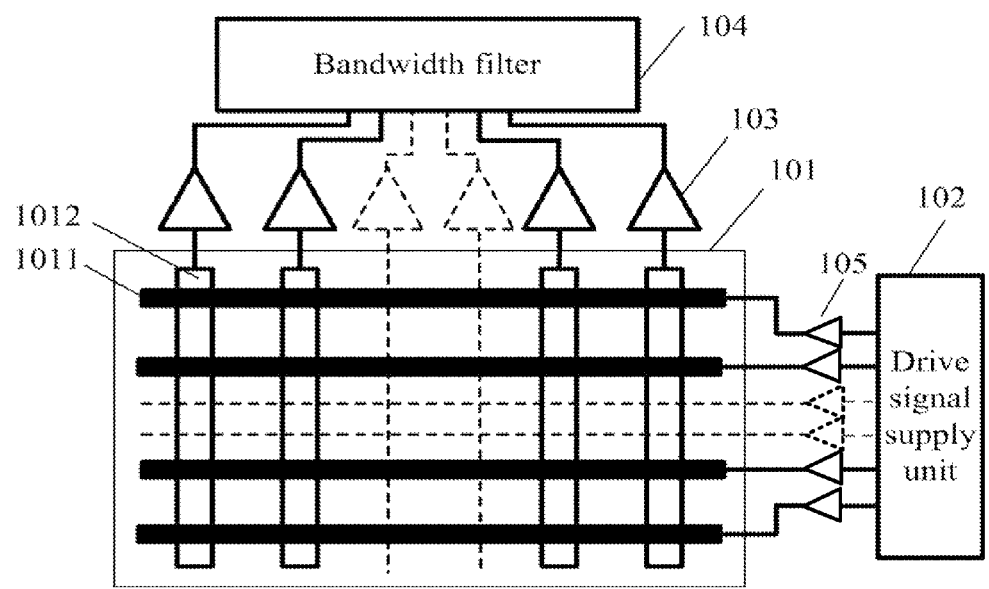
FIG. 3 is a schematic diagram of a touch signal scan apparatus according to a third embodiment of the invention.

A third embodiment of the invention provides a touch signal scan apparatus as illustrated in FIG. 3. The apparatus includes: an electrode layer 101 in which M drive lines 1011 and N sense lines 1012 are arranged, wherein, M and N are integers greater than 0; a drive signal supply unit 102 electrically connected with the M drive lines 1011; and N amplifiers 103 electrically connected with different output ends of the N sense lines in one-to-one correspondence (i.e., each of the N amplifiers is electrically connected with a respective output terminal of the N sense lines).

The drive signal supply unit 102 is configured to supply drive signals with at least two different frequencies to the M drive lines 1011 in a period of one frame, and the frequencies of the drive signals supplied to two adjacent drive lines 1011 are different.

The apparatus further includes a bandwidth filter 104 electrically connected with the N amplifiers 103, and the apparatus is configured to separate sense signals output from the N amplifiers 103 so as to obtain the sense signals corresponding to the respective drive signals with the at least two different frequencies.

Furthermore, the drive signal supply unit 102 is electrically connected with the M drive lines 1011 through M amplifiers 105.

Signal input ends (terminals) of two adjacent ones of the M drive lines 1011 are at the same side. It shall be noted that the signal input ends of two adjacent drive lines 1011 are at the same side of the electrode layer, wherein, the same side includes the right side or the portion near the right edge of the electrode layer 101 as illustrated in FIG. 3, but those skilled in the art can appreciate that the left side or the portion near the left edge of the electrode layer 101 will also be included in the embodiment.

Figure 4:
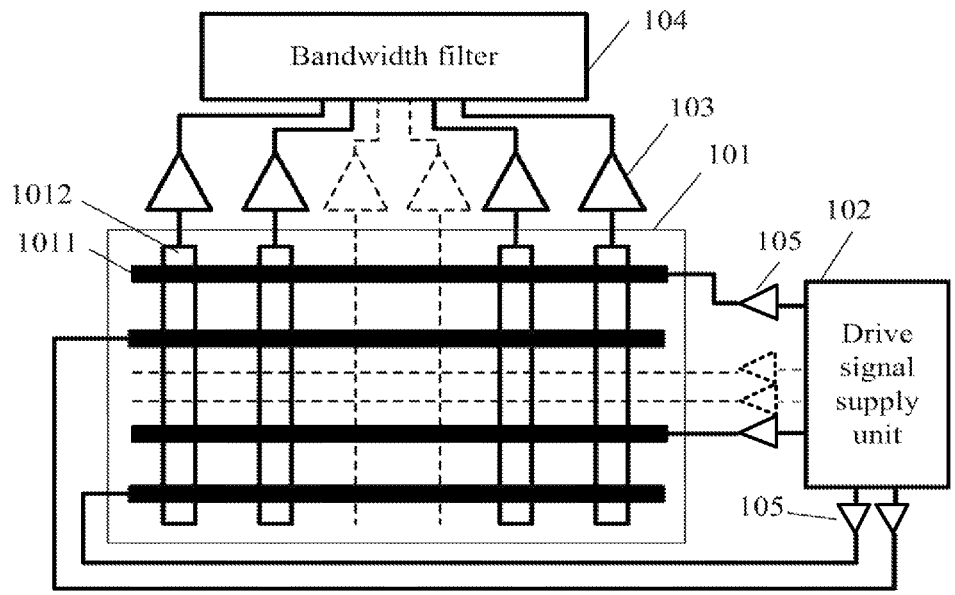
FIG. 4 is a schematic diagram of another touch signal scan apparatus according to the third embodiment of the invention.

Moreover, as illustrated in FIG. 4, the signal input ends of two adjacent ones of the M drive lines 1011 can alternatively be at different (opposite) sides of the electrode layer.

In the third embodiment, the drive signal supply unit and the bandwidth filter enable inputting of the drive signals with the at least two drive frequencies, or in other words, they enable concurrent driving of at least two drive lines, and then process the sense signals to thereby improve the detecting precision of a moving finger, make acquired information of the touching finger more comprehensive and hence improve the efficiency of scanning a touch screen. The drive signal supply unit also supplies the M drive lines with the drive signals amplified by the amplifiers, which prevents the signals from attenuated, thereby ensuring the stability of the scan.

Figure 5:
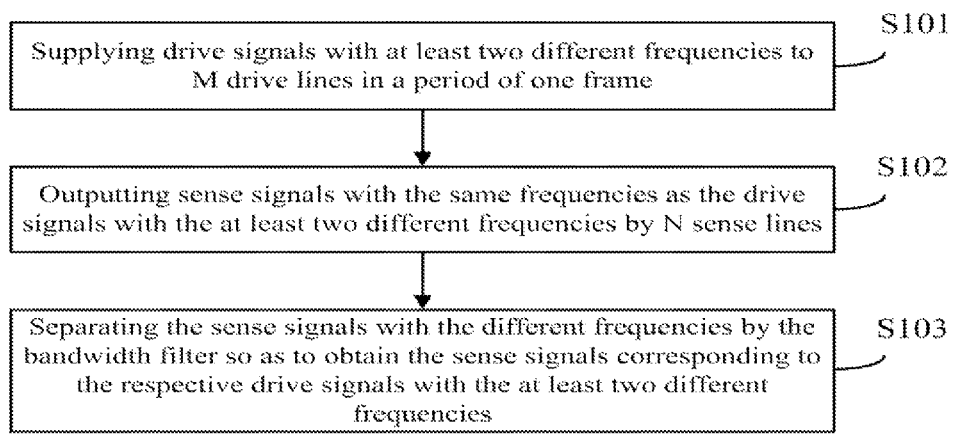
FIG. 5 is a flow diagram of a touch signal scan method according to a fourth embodiment of the invention.

A fourth embodiment of the invention provides a touch signal scan method as illustrated in FIG. 5 including the following steps:

In step S101, supplying drive signals with at least two different frequencies to M drive lines in a period of one frame, and the frequencies of the drive signals supplied to two adjacent drive lines are different;

In step S102, outputting sense signals with the same frequencies as the drive signals with the at least two different frequencies by N sense lines to a bandwidth filter, the bandwidth filter is electrically connected with N amplifiers which are electrically connected with the N sense lines in one-to-one correspondence;

In step S103, separating the sense signals with the different frequencies by the bandwidth filter so as to obtain the sense signals corresponding to the respective drive signals with the at least two different frequencies.

This embodiment enables inputting of the drive signals with the at least two drive frequencies or in other words, enables concurrently driving at least two drive lines, and enables separating and interpreting the at least two sense signals to thereby improve the detecting precision of a moving finger, thus making acquired information of the touching finger more comprehensive and hence improving the efficiency of scanning a touch screen. On the other hand, since a concurrent scan scheme of at least two rows is adopted, the time for scanning a frame can be reduced at least to half of the original time, thereby greatly attenuating a delay effect caused by resistances and capacitances of the drive lines and further improving the detecting precision of a touch signal.

Furthermore, referring to FIG. 1, the drive signals are supplied to the same side of two adjacent lines of the M drive lines in a period of one frame in step S101. These drive signals are supplied with at least two frequencies, and the frequencies of the drive signals supplied to the two adjacent drive lines are different. It shall be noted that the term "same side" here includes both the right side or the portion near the right edge of the electrode layer 101 as illustrated in FIG. 1 and the left side or the portion near the left edge of the electrode layer 101.

Of course, the drive signals can alternatively be supplied to different sides of two adjacent lines of the M drive lines in a period of one frame in step S101, as illustrated in FIG. 2. These drive signals are supplied with at least two frequencies, and the frequencies of the drive signals supplied to the two adjacent drive lines are different.

Figure 6:
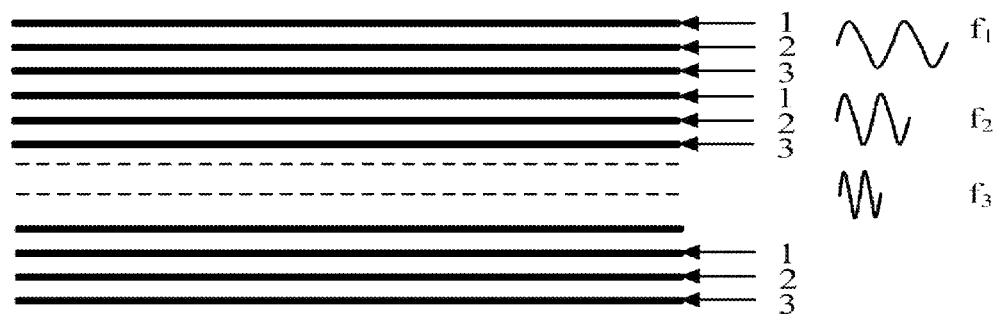
FIG. 6 and FIG. 7 are schematic diagrams of scanning with drive signals with different frequencies in the touch signal scan method according to the fourth embodiment of the invention.
Figure 7:

Moreover, the drive signals with at least two different frequencies, supplied to the M drive lines in a period of one frame in step S101, may include the drive signals with three or more frequencies. FIG. 6 illustrates the drive signals being input to the same side of the M drive lines by way of an example in the case that a drive signal 1, a drive signal 2 and a drive signal 3 respectively with three different frequencies $f_1$, $f_2$ and $f_3$ are supplied to the M drive lines in a period of one frame and the frequencies of the drive signals supplied to two adjacent drive lines are different. FIG. 7 illustrates the drive signals being input to different sides of the M drive lines by way of another example in the case that a drive signal 1, a drive signal 2, a drive 3 and a drive signal 4 respectively with four different frequencies $f_1$, $f_2$, $f_3$ and $f_4$ are supplied to the M drive lines in a period of one frame and the frequencies of the drive signals supplied to two adjacent drive lines are different.

Figure 8:
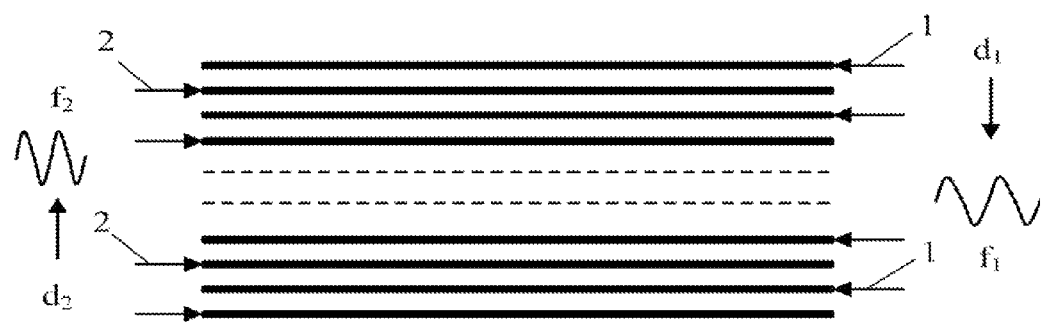
FIG. 8 is a schematic diagram of scanning with drive signals with different frequencies in different scan directions according to an embodiment of the invention.

Preferably, as illustrated in FIG. 8, a drive signal 1 and a drive signal 2 respectively with the two different frequencies $f_1$ and $f_2$ are supplied to the M drive lines, and the frequencies of the drive signals supplied to every other drive lines are the same.

Preferably, the frequency of the drive signal supplied to each one of the M drive lines is different.

Figure 9:
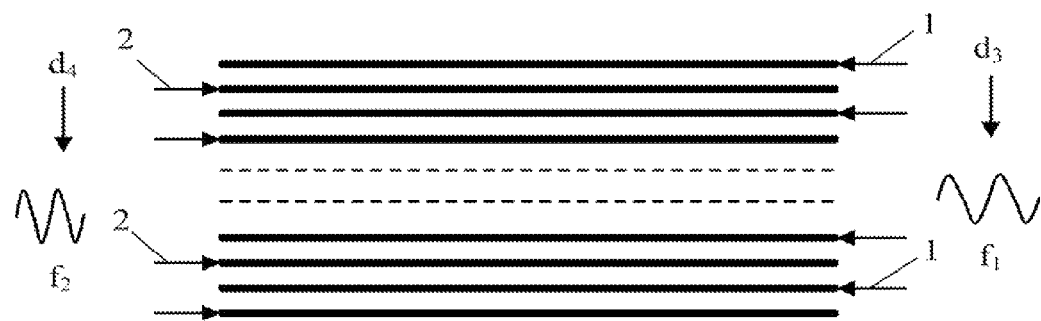
FIG. 9 is a schematic diagram of scanning with drive signals with different frequencies in the same scan direction according to an embodiment of the invention.

Moreover, the scan directions of drive signals supplied to the M drive lines respectively with the two different frequencies $f_1$ and $f_2$ may be the same, as scan direction $d_3$ and $d_4$ illustrated in FIG. 9. In another case, scan directions of the drive signals supplied to the M drive lines respectively with the two different frequencies $f_1$ and $f_2$ may be opposite, as scan direction $d_1$ and $d_2$ illustrated in FIG. 8.

Preferably, the drive signals with different frequencies are supplied to the M drive lines at the same time.

In a firth embodiment of the invention, a preferred touch signal scan method of the invention will be described in detail with reference to the schematic diagram of input drive signals illustrated in FIG. 8. FIG. 8 illustrates a drive signal 1 with a frequency $f_1$ scanning odd-numbered lines of the M drive lines in a scan direction $d_1$; and a drive signal 2 with a frequency $f_2$ scanning even-numbered lines of the M drive lines in a scan direction $d_2$. The directions $d_1$ and $d_2$ are opposite, and the drive signal 1 and the drive signal 2 are input at different sides of the M drive lines.

Since the drive signal 1 and the drive signal 2 with different frequencies scan concurrently, even if the scan time or driving time of each row of scan lines remains the same as the original time, the time for scanning the entire touch screen will only be half of that with a single frequency, that is, the scan speed doubles. Similarly, signals with K different frequencies can be used for concurrently scanning or driving to thereby accelerate a scan speed to K times. The K frequencies can be set depending upon a particular implementation so a description will not be repeated herein for the sake of brevity.

In a sixth embodiment of the invention, it shall be noted in the implementation of the foregoing embodiment, after the drive signals with different frequencies are input respectively to the odd-numbered lines and the even-numbered lines of the drive lines, since the generation of touch signals relates to the frequencies of the drive signals to some extent, sense signals output from the sense lines will have responses with different frequencies respectively corresponding to the frequencies of the odd-numbered lines and even-numbered lines of the drive lines. In order to eliminate such a difference, the sixth embodiment is based on the fifth embodiment, in which the frequencies of the drive signals supplied to two adjacent drive lines are swapped in a period of two adjacent frames. Specifically, during a first frame, the drive signal 1 may be input to the odd-numbered lines of the M drive lines and the drive signal 2 may be input to the even-numbered lines of the M drive lines; and during a second frame, the drive signal 1 may be input to the even-numbered lines of the M drive lines and the drive signal 2 may be input to the odd-numbered lines of the M drive lines. Such an alternate swap will be applied sequentially to the drive signals input in subsequent frames, so that the output signals of the sense lines will have no apparent difference in frequency on average, and a wider frequency response characteristic can be obtained.

It shall be noted that the drawings in all the foregoing embodiments are intended to illustrate the invention more clearly but shall not limit the invention. Evidently, those skilled in the art can make various modifications and variations to the invention without departing from the essential and scope of the invention. Thus, the invention is intended to encompass these modifications and variations thereto as long as the modifications and variations come within the scope of the appended claims and their equivalents.

What is claimed is:

1. A touch signal scan apparatus, comprising:
   a drive signal supply unit electrically connected with M drive lines in a one-to-one correspondence;
   an electrode layer in which the M drive lines and N sense lines are arranged;
   N amplifiers electrically connected with different output ends of the N sense lines in a one-to-one correspondence; and
   a bandwidth filter electrically connected with the N amplifiers; wherein:
   the drive signal supply unit is configured to supply drive signals with at least two different frequencies to the M drive lines in a period of one frame, the frequencies of the drive signals supplied to two adjacent ones of the drive lines are different, and the drive signals with the at least two different frequencies are supplied to at least two of the drive lines at a same time; and wherein the bandwidth filter is configured to separate sense signals output from the N amplifiers so as to obtain the sense signals corresponding to the respective drive signals with the at least two different frequencies.

2. The apparatus according to claim 1, wherein the drive signal supply unit is electrically connected with the M drive lines through M amplifiers.

3. The apparatus according to claim 1, wherein signal input ends of the two adjacent lines of the M drive lines are at a same side of the electrode layer.

4. The apparatus according to claim 1, wherein signal input ends of the two adjacent lines of the M drive lines are at different sides of the electrode layer.

5. A touch signal scan method, comprising following steps:

supplying drive signals with at least two different frequencies to M drive lines in a period of one frame, wherein the frequencies of the drive signals supplied to two adjacent drive lines are different, and the drive signals with the at least two different frequencies are supplied to at least two of the drive lines at a same time;

outputting sense signals with same frequencies as the drive signals with the at least two different frequencies by N sense lines to a bandwidth filter, the bandwidth filter being electrically connected with N amplifiers, wherein the N amplifiers are electrically connected with the N sense lines in a one-to-one correspondence; and separating the sense signals with the different frequencies by the bandwidth filter so as to obtain the sense signals corresponding to the respective drive signals with the at least two different frequencies.

6. The method according to claim 5, wherein the drive signals with the at least two different frequencies are supplied to the M drive lines through M amplifiers.

7. The method according to claim 5, wherein the drive signals are supplied to a same side of the two adjacent lines of the M drive lines.

8. The method according to claim 5, wherein the drive signals are supplied to different sides of the two adjacent lines of the M drive lines.

9. The method according to claim 5, wherein the drive signals with two different frequencies are supplied to the drive lines, and the frequencies of the drive signals supplied to every other drive lines are the same.

10. The method according to claim 9, wherein the drive signals supplied to the M drive lines with the two different frequencies have a same scan direction or opposite scan directions.

11. The method according to claim 9, wherein the frequencies of the drive signals supplied to the two adjacent lines of the drive lines are swapped in a period of two adjacent frames.

12. The method according to claim 5, wherein the frequencies of the drive signals supplied to each one of the drive lines are different.

13. The method according to claim 12, wherein the drive signals with the different frequencies are supplied to the M drive lines at the same time.

* * * * *